(12) United States Patent
Evans et al.

(10) Patent No.: US 7,313,817 B2
(45) Date of Patent: Dec. 25, 2007

(54) DATA TRANSMISSION SYSTEM UTILIZING EFFICIENT COMPLEXITY ESTIMATION OF THE KOLMOGOROV COMPLEXITY FOR DATA TRANSMISSION

(75) Inventors: Scott C. Evans, Burnt Hills, NY (US); John E. Hershey, Ballston Lake, NY (US); Gary J. Saulnier, East Greenbush, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1092 days.

(21) Appl. No.: 10/462,937

(22) Filed: Jun. 17, 2003

(65) Prior Publication Data

US 2004/0257988 A1    Dec. 23, 2004

(51) Int. Cl.
   *G06F 9/00*    (2006.01)
   *G06F 15/16*   (2006.01)
   *G06F 17/00*   (2006.01)
   *G06F 15/173*  (2006.01)

(52) U.S. Cl. ............................ 726/13; 726/12; 726/14; 709/223; 709/224; 709/225

(58) Field of Classification Search .................. 726/11, 726/12, 13, 14
See application file for complete search history.

(56) References Cited

U.S. PATENT DOCUMENTS

| | | |
|---|---|---|
| 4,814,746 A | 3/1989 | Miller et al. |
| 4,935,882 A | 6/1990 | Pennebaker et al. |
| 5,465,219 A | 11/1995 | Jeffers |
| 5,506,580 A | 4/1996 | Whiting et al. |
| 5,532,694 A | 7/1996 | Mayers et al. |
| 5,602,964 A | 2/1997 | Barrett |
| 5,608,396 A | 3/1997 | Cheng |
| 5,627,534 A | 5/1997 | Craft |
| 5,635,931 A | 6/1997 | Franaszek |
| 5,652,581 A | 7/1997 | Furlan et al. |

(Continued)

OTHER PUBLICATIONS

"Active Network Management, Kolmogorov Complexity, and Streptichrons," A.B. Kulkarni, General Electric Company, GE Research & Development Center, Dec. 2000, pp. 1-16.*

(Continued)

*Primary Examiner*—Benjamin E. Lanier
(74) *Attorney, Agent, or Firm*—Ronald E. Prass, Jr.; Prass & Irving, LLP

(57) ABSTRACT

A system, method and program storage device tangibly embodying a program of instructions for determining whether to allow transmission of data from a source destined for a destination over a network, comprising: acquiring a string of a predetermined length in bits (L) from the data; partitioning the acquired string into a partition of phrases, each of the phrases in the partition being unique and having one or more bits; determining a number of phrases (N) in the partition; estimating a normalized complexity (C) for the Kolmogorov Complexity in the acquired string via $$C \equiv \frac{N}{\sqrt{2L}};$$

and evaluating whether to allow transmission of the data based on a comparison of whether the normalized complexity estimate (C) is within a predetermined normal complexity estimate band.

26 Claims, 7 Drawing Sheets

U.S. PATENT DOCUMENTS

| | | | |
|---|---|---|---|
| 5,836,003 | A | 11/1998 | Sadeh |
| 5,867,114 | A | 2/1999 | Barbir |
| 5,886,655 | A | 3/1999 | Rust |
| 6,018,303 | A | 1/2000 | Sadeh |
| 6,088,452 | A | 7/2000 | Johnson et al. |
| 6,122,379 | A | 9/2000 | Barbir |
| 6,281,816 | B1 | 8/2001 | Kampf |
| 6,309,424 | B1 | 10/2001 | Fallon |
| 6,373,411 | B1 | 4/2002 | Shoham |
| 6,377,930 | B1 | 4/2002 | Chen et al. |
| 6,400,289 | B1 | 6/2002 | Banerji |
| 6,404,931 | B1 | 6/2002 | Chen et al. |
| 2001/0003165 | A1 | 6/2001 | Van Der Vleutenet et al. |
| 2002/0101367 | A1 | 8/2002 | Geiger et al. |

OTHER PUBLICATIONS

"Detecting Distributed Denial-of-Service Attacks Using Kolmogorov Complexity Metrics," A.B. Kulkarni, General Electric Company, GE Research & Development Center, Dec. 2001, pp. 1-7.*

"Information Assurance through Kolmogorov Complexity," Scott Evans, General Electric Company, GE Research & Development Center, Jun. 2001, pp. 1-10.*

"Symbol Compression Ratio for String Compression and Estimation of Kolmogorov complexity, "S.C. Evans et al., General Electric Company, GE Research & Development Center, Nov. 2001, Technical Information Series.

"Code Compression", Jens Ernst et al., Proceedings of the ACM SIGPLAN '97 Conference on Programming Language Design on Implementation (PLDI): xxx-yyy, 1997.

"Universal Prediction", Neir Merhav, IEEE Transactions of Information Theory, vol. 44, No. 6, Oct. 1998, pp. 2124-2147.

"Fifty Years of Shannon Theory," Sergio Verdu, IEEE Transactions of Information Theory, vol. 44, No. 6, Oct. 1998, pp. 2057-2078.

"Source Codes as Random Number Generators", Karthik Visweswariah, et al., IEEE Transactions on Information Theory, vol. 44, No. 2, Mar. 1998, pp. 462-471.

"Network Security Through Conservation of Complexity", Scott c. Evans et al., paper No. 710 submitted to MILCOM Mar. 8, 2002, unclassified.

"Condensing Computable Scenes Using Visual Complexity and Film Syntax Analysis" Hari Sundaram, et al., ICME 2001, Aug. 22-27, Tokyo Japan.

"Four Stage Model of Data Compression", Wikipedia, the free encyclopedia, www.wikipedia.org/w/wiki.phtml?title=Four_stage_model_of_data_compression.

"Data compression/four stage compression model", Wikipedia, the free encyclopedia.

"Syntactic Measures of Complexity Appendix 1—A Brief Overview of Some Existing Formulations of Complexity", Bruce Edmonds, http://cfpm.org/pub/users/bruce/thesis/appen1.pdf.

Huffman/Lempel-Ziv Compression Methods, www.dcs.napier.ac.uk/~bill/pdf/ADCO_C03.PDF.

"IBRAC: Image-Based Rendering Acceleration and Compression" Iimi Yoon et al, http//graphics.usc.edu/cgit/pdf/papers/hp.pdf.

* cited by examiner

DATA TRANSMISSION SYSTEM UTILIZING EFFICIENT COMPLEXITY ESTIMATION OF THE KOLMOGOROV COMPLEXITY FOR DATA TRANSMISSION

BACKGROUND OF THE INVENTION

1. Technical Field of the Invention

The present invention generally relates to complexity estimation. More specifically, the present invention is directed to a data transmission system that efficiently performs complexity estimation for the Kolmogorov Complexity in a given finite string (i.e., string) for determining whether to allow or reject transmission of data in the data transmission system.

2. Description of the Prior Art

The Kolmogorov Complexity is a fundamental measure of information with growing applications and importance. The estimation of the Kolmogorov Complexity is key to objective information system monitoring and analysis. There are many applications of the Kolmogorov Complexity, such as, information assurance and network security, where estimates of the Kolmogorov Complexity identify abnormal behavior. However, all the applications of the Kolmogorov Complexity are limited due to its incomputable nature and are impacted by improvements or innovations in the ability to efficiently estimate the Kolmogorov Complexity.

The Kolmogorov Complexity is a measure of the descriptive complexity in an object, i.e., a given string. More specifically, it refers to the minimum length of a program such that a universal computer can generate the specific sequence of the given string. The Kolmogorov Complexity can be described with the following equation:

$$K_\varphi(x) = \left\{ \min_{\varphi(p)=x} l(p) \right\}.$$

In this equation, $\varphi$ represents a universal computer, $l(p)$ represents a program of length p, and x represents a string. The Kolmogorov Complexity equation dictates that a random string has a rather high complexity, which is on the order of its length, as patterns in the random string cannot be discerned to reduce the size of a program that generates the random string. On the other hand, a string with a large amount of structure has a fairly low complexity. Because universal computers can be equated through programs of constant length, a mapping can be made between universal computers of different types. The Kolmogorov Complexity of a given string on two different computers differs by known or determinable constants.

The Kolmogorov Complexity can also use a given string to reduce the complexity or the minimum length of a program necessary to produce a new string. More specifically, the Kolmogorov Complexity K(y|x) of a string y, given string x as input is described by the equation:

$$K_\varphi(y \mid x) = \left\{ \begin{array}{c} \min_{\varphi(p,x)=y} l(p) \\ \infty, \text{ if there is no } p \text{ such that } \varphi(p,x) = y \end{array} \right\}.$$

In this equation, $l(p)$ represents a program length p, and $\varphi$ is a particular universal computer under consideration. Consequently, knowledge of or input of the string x may reduce the complexity or program size necessary to produce the new string y.

The major difficulty with the foregoing Kolmogorov Complexity equations is that they are incomputable. More specifically, any program that produces the given string represents an upper bound on the Kolmogorov Complexity for that string. However, the lower bound on the given string remains incomputable.

The Lempel/Ziv 78 universal compression algorithm (i.e., "LZ78 compression algorithm") has been used for estimating the Kolmogorov Complexity in various applications, most notably, information and network security. In these applications the LZ78 is used to compress a network protocol or other information and an inverse compression ratio of the compressed protocol or information to the uncompressed protocol or information used to estimate the complexity for the Kolmogorov Complexity. More specifically, because the Kolmogorov Complexity is an ultimate compression bound for a given string, a natural choice for estimating the Kolmogorov Complexity is the LZ78 compression algorithm. The LZ78 compression algorithm defines a measure of complexity for a finite string rooted in the ability to produce the string from simple copy operations. However, computing the estimate for the Kolmogorov Complexity of a string utilizing the LZ78 compression algorithm requires performing the entire compression processes of the LZ78 compression algorithm and comparing inverse compression ratios as a measure of the complexity for the string. These represent time and resource inefficiencies in computing the estimate for the Kolmogorov Complexity.

Figure 1:
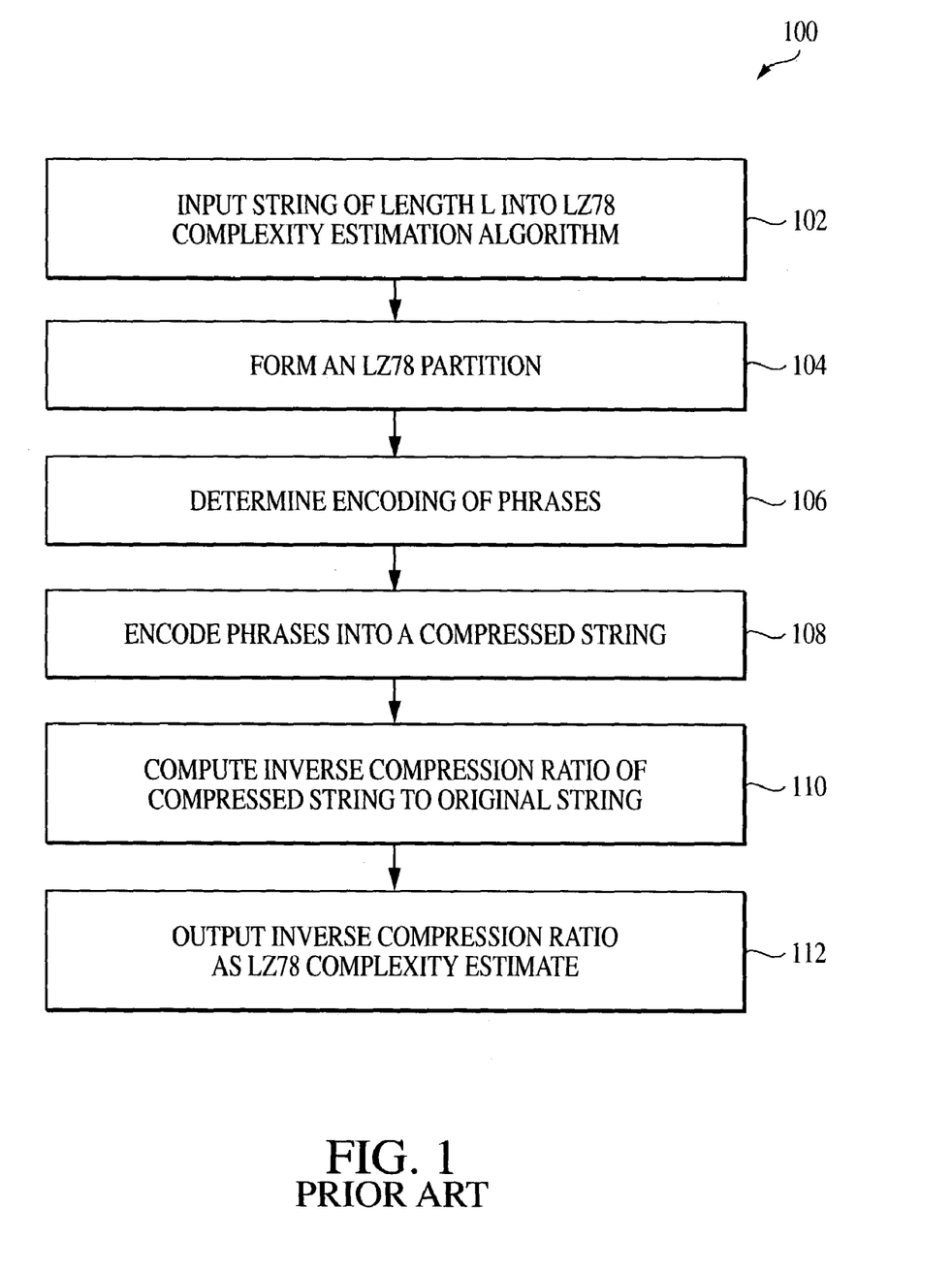
FIG. 1 is a representation of a prior art LZ78 compression algorithm.

FIG. 1 is a representation of a prior art LZ78 compression algorithm 100. A finite string of length L is inputted into the LZ78 compression algorithm 100 via known methods and means at step 102. At step 104, using the inputted string, the LZ78 compression algorithm 100 forms an LZ78 partition, which is a central aspect of the LZ78 compression algorithm 100. More specifically, the LZ78 algorithm partitions a finite string into phrases that have not been seen before, thereby forming a codebook that enables the encoding of the finite string with small indices, given that the finite string is long and repetitious. For example, considering an inputted finite string of "1011010010011010010011101001001100010", the LZ78 compression algorithm 100 forms an LZ78 partition by successively identifying new sub-strings hat has not yet been identified, i.e., a phrases, and inserting commas after the phrases. The following LZ78 partition results from the inputted finite string "1,0,11,01,00,10,011,010,0100,111, 01001,001,100,010".

Further with reference to FIG. 1, at step 106, the LZ78 compression algorithm 100 determines the encoding of determined phrases in the partition for the inputted string. The encoding is accomplished by representing each phrase in the partition as integer pair, where the first integer of the integer pair identifies the index of each phrase corresponding to all but the last bit of each phrase (if there is not prefix the index of zero is used. The second integer in the integer pair corresponds to the last bit of the phrase, i.e., a one or a zero. In the foregoing example, the following set of integer pairs is produced: (0,1), (0,0), (1,1), (2,1), (2,0), (1,0), (4,1), (4,0), (8,0), (3,1), (9,1), (6,0), and (4,0). Each integer pair (j, k) in the set of integer pairs is replaced with a single integer equal to 2j+k. The replacement maps each integer pair (or phrase) to a distinct integer. The foregoing set of integer pairs maps to the following integers: 1, 0, 3,5,4,2,9,8,16,7, 19,11, and 8.

Still further with reference to FIG. 1, at step 108, the determined phrases identified by the integers are encoded using binary decimal codes padded with zeros to ensure the length of each word is a ceiling of $\log_2(kj)$ for index number j and alphabet size k. The concatenation of the codes forms the compressed string at step 108. In order to estimate the complexity of the Kolmogorov Complexity, at step 110, the LZ78 compression algorithm 100 computed an inverse compression ratio of the compressed string to the original inputted string. The inverse compression ratio is based on the size (in bits or bytes) of the compressed string with respect to the original uncompressed string. The complexity estimate is outputted at step 112 and may be utilized by the aforementioned applications, such as, information security.

Therefore, there is a need in the art for providing an efficient method and system that estimates the Kolmogorov Complexity of a finite string without performing the inefficient encoding, compression and inverse compression ratio associated with the LZ78 compression algorithm's complexity estimation for the Kolmogorov Complexity.

SUMMARY OF THE INVENTION

According to an embodiment of the present invention, there is provided a data transmission system for determining whether to allow transmission of data, the data transmission system comprising: a source for transmitting data destined for a destination over a network; a data acquisition means for acquiring a string of a predetermined length in bits (L) from the data; a complexity estimator for: (i) partitioning the acquired string into a partition of phrases, each of the phrases in the partition being unique and having one or more bits; (ii) determining a number of phrases (N) in the partition; and (iii) estimating a normalized complexity (C) for the Kolmogorov Complexity in the acquired string via $$C \equiv \frac{N}{\sqrt{2L}};$$

a complexity evaluator for evaluating whether to allow transmission of the data based on a comparison of whether the normalized complexity estimate (C) is within a predetermined normal complexity estimate band; and the destination for receiving the data transmitted from the source based on the evaluation.

According to another embodiment of the present invention, there is provided a complexity analyzer for determining whether to allow transmission of data from a source destined for a destination over a network, the complexity analyzer comprising: a data acquisition means for acquiring a string of a predetermined length in bits (L) from the data; a complexity estimator for: (i) partitioning the acquired string into a partition of phrases, each of the phrases in the partition being unique and having one or more bits; (ii) determining a number of phrases (N) in the partition; and (iii) estimating a normalized complexity (C) for the Kolmogorov Complexity in the acquired string via $$C \equiv \frac{N}{\sqrt{2L}};$$

and a complexity evaluator for evaluating whether to allow transmission of the data based on a comparison of whether the normalized complexity estimate (C) is within a predetermined normal complexity estimate band.

According to yet another embodiment of the present invention, there is provided a complexity estimator for determining an estimate of complexity for Kolmogorov Complexity in a string of a predetermined length in bits (L) acquired from data transmitted from a source destined for a destination over a network, the complexity estimator comprising: a partition means for partitioning the acquired string into a partition of phrases, each of the phrases in the partition being unique and having one or more bits; a determination means for determining a number of phrases (N) in the partition; and an estimation means for estimating a normalized complexity (C) for the Kolmogorov Complexity in the acquired string via $$C \equiv \frac{N}{\sqrt{2L}},$$

wherein transmission of the data is enabled to the destination if the normalized complexity estimate (C) is within a predetermined normal complexity estimate band.

According to still another embodiment of the present invention, there is provided a method for determining whether to allow transmission of data from a source destined for a destination over a network, the method comprising: acquiring a string of a predetermined length in bits (L) from the data; partitioning the acquired string into a partition of phrases, each of the phrases in the partition being unique and having one or more bits; determining a number of phrases (N) in the partition; estimating a normalized complexity (C) for the Kolmogorov Complexity in the acquired string via $$C \equiv \frac{N}{\sqrt{2L}};$$

and evaluating whether to allow transmission of the data based on a comparison of whether the normalized complexity estimate (C) is within a predetermined normal complexity estimate band.

According to a further embodiment of the present invention, there is provided a method for determining an estimate of complexity for Kolmogorov Complexity in a string of a predetermined length in bits (L) acquired from data transmitted from a source destined for a destination over a network, the method comprising: partitioning the acquired string into a partition of phrases, each of the phrases in the partition being unique and having one or more bits; determining a number of phrases (N) in the partition; and estimating a normalized complexity (C) for the Kolmogorov Complexity in the acquired string via $$C \equiv \frac{N}{\sqrt{2L}},$$

wherein transmission of the data is enabled to the destination if the normalized complexity estimate (C) is within a predetermined normal complexity estimate band.

According to still a further embodiment of the present invention, there is provided a program storage device, tangibly embodying a program of instructions executable by a machine to perform a method for determining whether to allow transmission of data from a source destined for a destination over a network, the method comprising: acquiring a string of a predetermined length in bits (L) from the data; partitioning the acquired string into a partition of phrases, each of the phrases in the partition being unique and having one or more bits; determining a number of phrases (N) in the partition; estimating a normalized complexity (C) for the Kolmogorov Complexity in the acquired string via $$C \equiv \frac{N}{\sqrt{2L}};$$

and evaluating whether to allow transmission of the data based on a comparison of whether the normalized complexity estimate (C) is within a predetermined normal complexity estimate band.

According to a last embodiment of the present invention, there is provided a program storage device, tangibly embodying a program of instructions executable by a machine to perform a method for determining an estimate of complexity for Kolmogorov Complexity in a string of a predetermined length in bits (L) acquired from data transmitted from a source destined for a destination over a network, the method comprising: partitioning the acquired string into a partition of phrases, each of the phrases in the partition being unique and having one or more bits; determining a number of phrases (N) in the partition; and estimating a normalized complexity (C) for the Kolmogorov Complexity in the acquired string via $$C \equiv \frac{N}{\sqrt{2L}},$$

wherein transmission of the data is enabled to the destination if the normalized complexity estimate (C) is within a predetermined normal complexity estimate band.

BRIEF DESCRIPTION OF THE DRAWINGS

The features of the present invention will become apparent to one skilled in the art, in view of the following detailed description taken in combination with the attached drawings, in which.

DETAILED DESCRIPTION OF THE PREFERRED EMBODIMENT OF THE INVENTION

The invention is directed to a data transmission system that estimates complexity for the Kolmogorov Complexity in a given finite string (i.e., string), without performing the encoding, compressing and inverse compression ratios that are associated with the LZ78 compression algorithm estimation for the Kolmogorov Complexity, for determining whether to transmit data in the data transmission system.

Figure 2:
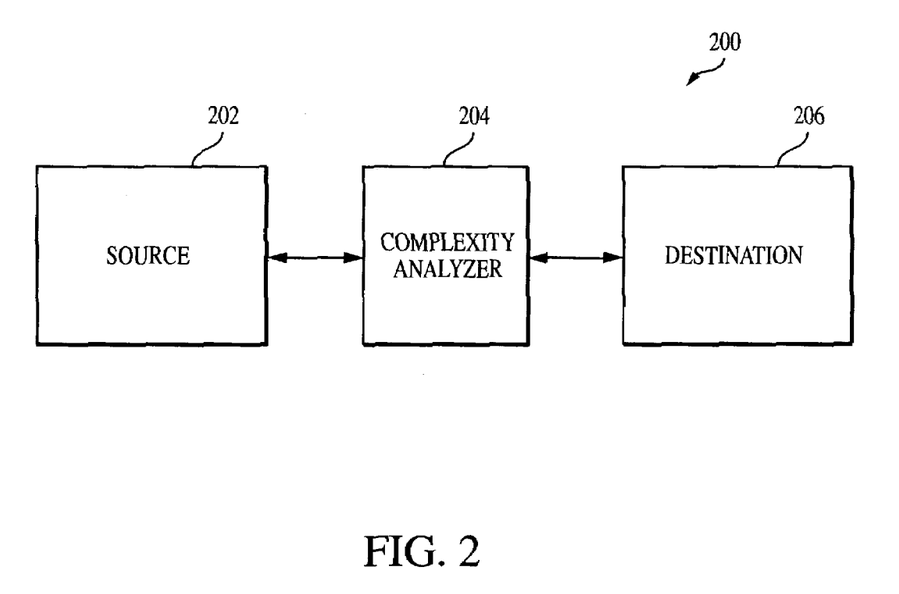
FIG. 2 represents an exemplary block diagram for a data transmission system comprising a complexity analyzer according to the present invention.

FIG. 2 is an exemplary block diagram of a data transmission system 200 comprising a complexity analyzer according to the present invention. The data transmission system comprises a source 202 and a destination 206. The source 202 and the destination 206 are nodes disposed along one or more networks, such as a LAN (i.e., local area network) an Intranet or over the Internet. The source 206 preferably represents a web server or a client server, while the destination 206 preferably represents a client of the web server or client server. Alternatively, the source 202 and destination 206 may represent data or resource storage and/or users operating client or server applications. In the data transmission system 200, data communication between the source 202 and destination 206 is preferably performed via transfer Control Protocol/Internet Protocol (i.e., "TCP/IP") communication protocol. Alternatively, data communication is performed via other conventional communication protocols that may include advanced data communications control protocol (i.e., "ADCCP"); synchronous data link control (i.e., "SDLC"), high-level data link control (i.e., "HDLC"); advanced program-to-program communications (i.e., "APPC"); and the like. It is noted that this list is non-exhaustive and may include other conventional communication protocols. An inventive component of the data transmission system 200 is a complexity analyzer 204 according to the present invention. The complexity analyzer 204 is preferably standalone. Alternatively, the complexity analyzer 204 is part of a firewall, a bridge, a gateway, a demilitarized zone (i.e., "DMZ"), or any other network node. The complexity analyzer 204 receives the data transmitted by the source 202 destined for the destination 206. Based on a complexity estimate of all or part of the received data, the complexity analyzer 204 determines whether to reject the received data from the source 202 or transmit the received data to the destination 206.

Figure 3:
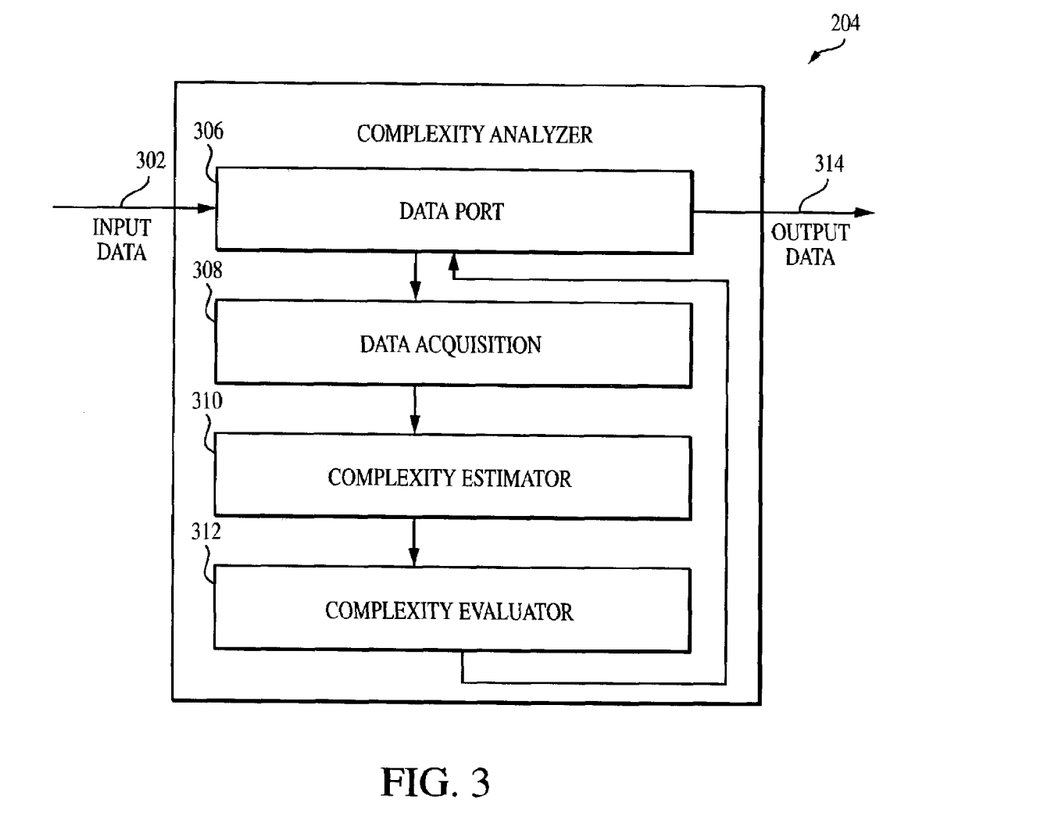
FIG. 3 is a detailed representation of the exemplary complexity analyzer of FIG. 2 that comprises a complexity estimator and evaluator according to the present invention.

FIG. 3 is a detailed representation of the exemplary complexity analyzer 204 of FIG. 2 that comprises a complexity estimator 310 and complexity evaluator 312 according to the present invention. The complexity analyzer 204 comprises a data port 306 for receiving input data transmitted from the source 202 destined for the destination 206 as output data 314. At certain predetermined increments of time or based on other triggering mechanisms, data acquisition 308 acquires all or a part of data received at the data port 306 for further processing. The data acquisition 308 acquires a string of a predetermined number of bits from the data port 306 in a conventional manner, such as by utilizing a physical layer protocol (e.g., RS232), and stores the acquired string in a buffer (not shown) associated with the data acquisition 308. Preferably, the data acquisition acquires a string of about 1,000 bits of data from the data port 306. The data acquisition 310 transmits the acquired string to the complexity estimator 310, which determines a complexity estimate of the Kolmogorov Complexity for the acquired string. Thereafter, the complexity estimator 310 transmits the complexity estimate for the acquired string to the complexity evaluator 312, which evaluates whether the complexity estimate is within a predetermined complexity estimate benchmark band representing normal complexity. The predetermined complexity estimate benchmark band is preferably stored in a storage means (not shown) of the complexity analyzer 204. The complexity estimator 312 transmits its evaluation of the complexity estimate to the data port 306, which then determines based on the evaluation of the complexity estimate whether or not the input data 302 received from the source 202 is to be transmitted as output data 314 to the destination 206 or whether to secure the port 306 by stopping all data communication from the source 202. Alternatively, based on the evaluation from the complexity evaluator 312, the data port 306 may also determine to allow transmission and to monitor future data communications from the source to the destination more closely.

Figure 4:
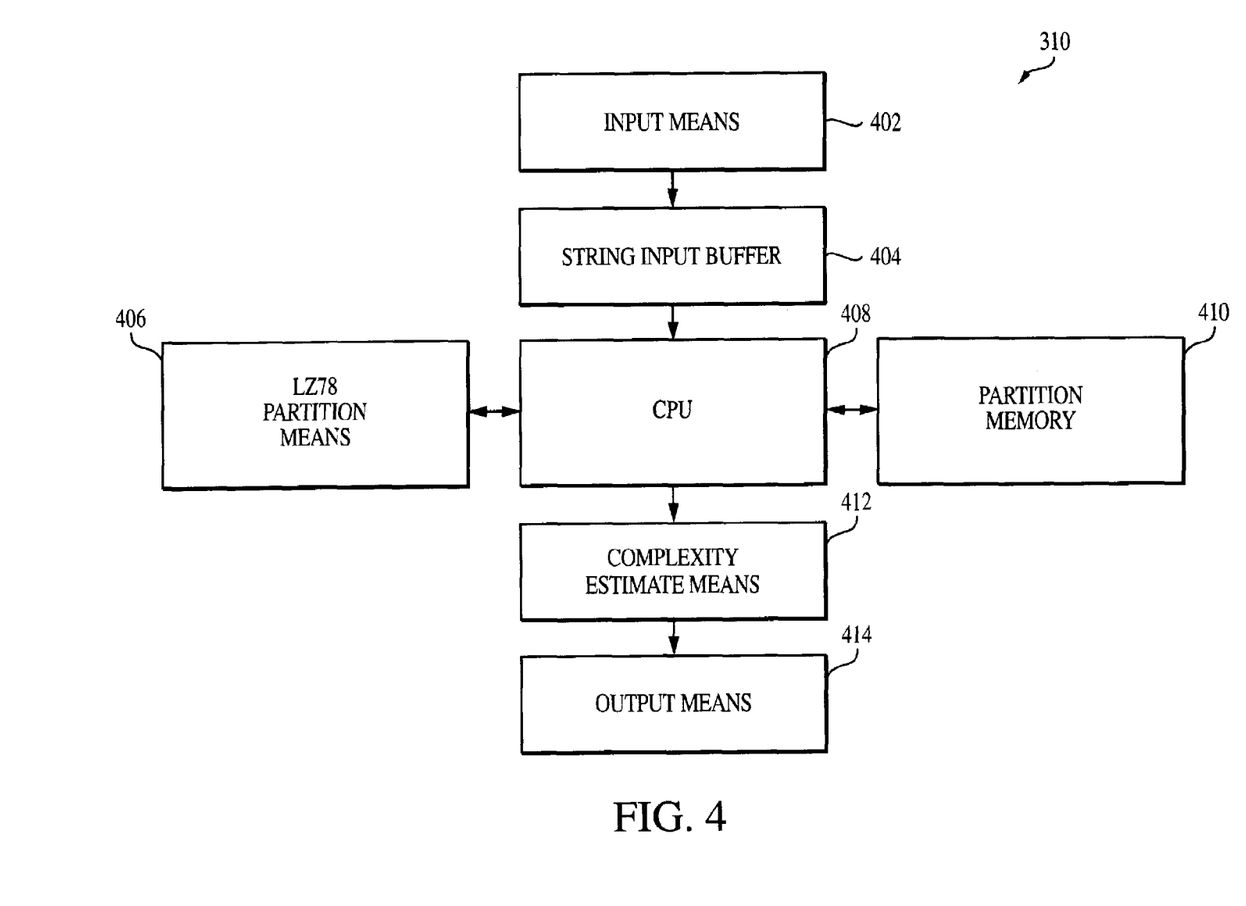
FIG. 4 is a detailed representation of the complexity estimator of FIG. 3 for computing a complexity estimate of the Kolmogorov Complexity according to the present invention.

FIG. 4 is detailed representation of the complexity estimator 310 for computing a complexity estimate of the Kolmogorov Complexity according to the present invention. The complexity estimator 310 inputs the acquired string from data acquisition 308 via input means 402 and stores in the inputted string in a string input buffer 404. The input means 402 may represent any conventional method and means for inputting data. A central processing unit (i.e., "CPU") 408 reads the inputted string from the string input buffer 404 and passes the inputted string to an LZ78 partition means 406. The LZ78 partition means 406 forms an LZ78 partition according to the description of step 104 in FIG. 1. The LZ78 partition means 406 then stores via the CPU 408 the LZ78 partition into a partition memory 410. Thereafter, the CPU reads the LZ78 partition from the partition memory 410 and passes the LZ78 partition to the complexity estimate means 412 that determines the complexity estimate for the Kolmogorov Complexity from the LZ78 partition according to the present invention. The complexity estimate of the Kolmogorov Complexity for the given string is then transmitted to the output means 414 for transmission to the complexity evaluator 312.

Figure 5:
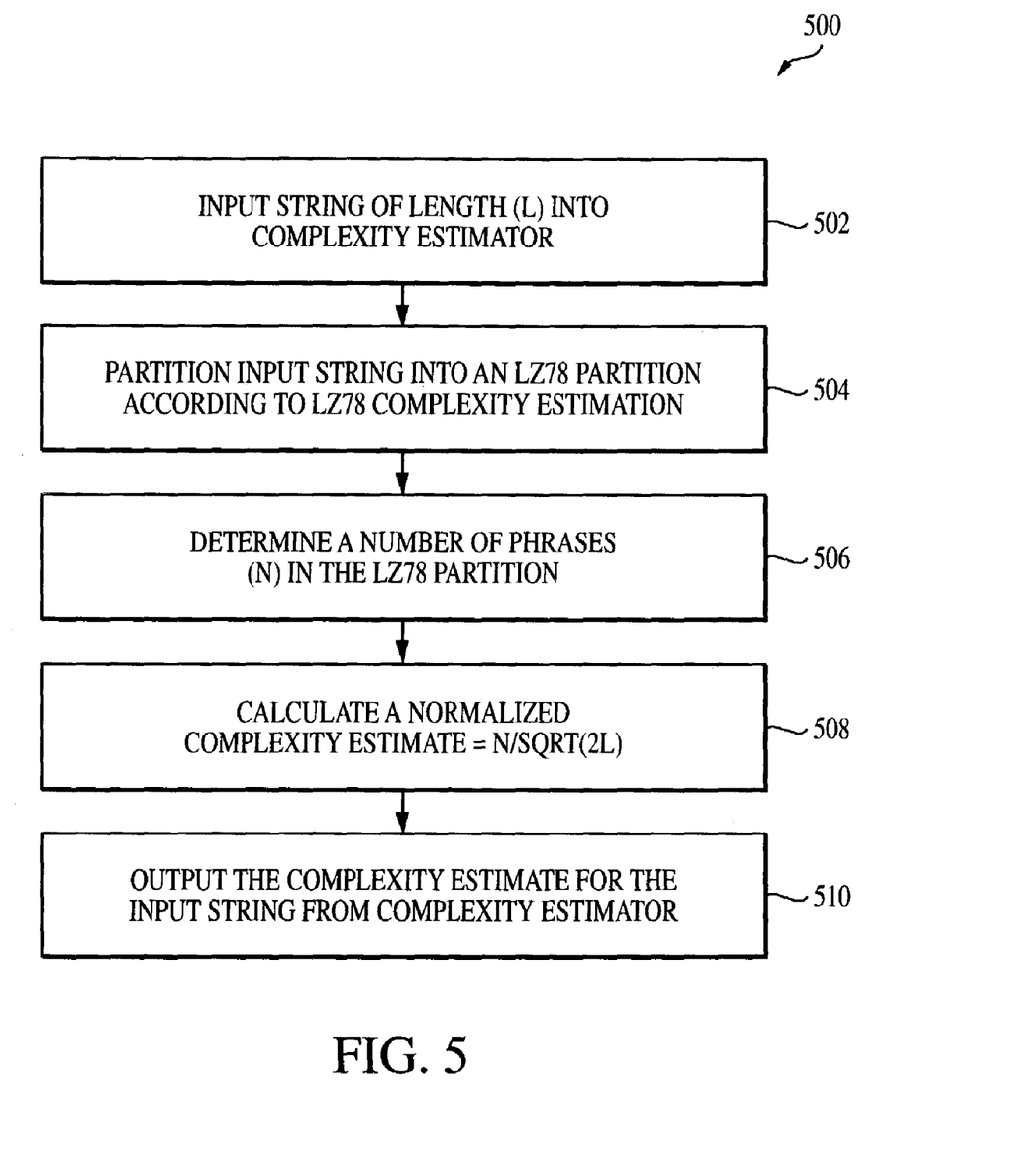
FIG. 5 represents an exemplary complexity estimation algorithm for computing a complexity estimate of the Kolmogorov Complexity according to the present invention.

FIG. 5 is an exemplary representation of a complexity estimation algorithm 500 for computing a complexity estimate of the Kolmogorov Complexity according to the present invention. At step 502, the complexity estimation algorithm 500 inputs a finite string of length (L) into the complexity estimator 310 according to the present invention. At step 204, the complexity estimation algorithm 500 partitions the inputted string into an LZ78 partition according to the LZ78 partition algorithm of the Lempel/Ziv 78 universal compression algorithm. The LZ78 partition comprises unique phrases separated by commas. As described above for example, an inputted string "1011010010011010010011101001001100010" is partitioned according to the Lempel/Ziv 78 universal compression algorithm into the following LZ78 partition "1,0,11,01, 00,10,011,010,0100,111,01001,001,100,010." The LZ78 partition is created by traversing the inputted string from the beginning to the end by successively incrementing the bit position in the string, meanwhile inserting commas for each new phrase within the string. For example, traversing the given string by starting at the beginning of the string, the first unique phrase is a "1" at bit position 1. Thereafter, continuing to bit position 2, the second unique phrase in the given string is a "0". While continuing onto bit position 3, the LZ78 compression algorithm determines that the phrase "1" already exists, retains the bit position and continues traversing the string to bit position 4. At bit position 4, the LZ78 compression algorithm determines a new phrase "11" formed from bit positions 3 and 4. The LZ78 compression algorithm continues to partition the inputted string by traversing the string until the end of the inputted string, while determining unique phrases in the inputted string. At step 506, the complexity estimation algorithm 500 determines the number of unique phrases (N), i.e., the number of unique sub-strings, in the LZ78 partition. Subsequently, at step 508, the complexity estimation algorithm 500 calculates a normalized complexity estimate (C) of the Kolmogorov Complexity for the inputted string via the formula $$C \equiv \frac{N}{\sqrt{2L}},$$

where C is a normalized complexity estimate of the Kolmogorov Complexity for the inputted string, N is a number of phrases in an LZ78 partition for the inputted string and L is a length of the inputted string. Lastly, at step 510, complexity estimation algorithm 500 outputs the normalized complexity estimate (C) from the complexity estimator 310 to the complexity evaluator 312.

Further with reference to FIG. 5, the foregoing formula $$C \equiv \frac{N}{\sqrt{2L}}$$

for the complexity estimate of the Kolmogorov Complexity is derived as follows. It is postulated that a minimum number of phrases (M) in an LZ78 partition occurs when each successive phrase is one bit longer than a previous phrase, where each phrase is unique and of monochromatically increasing length and the sum of lengths of each phrase is equal to the length (L) of the inputted string. This is represented by the following quadratic equation:

$$\sum_{m=1}^{M} m = L = \frac{M(M+1)}{2} = \frac{M^2}{2} + \frac{M}{2}.$$

Generally, a quadratic equation takes the form $ax^2+bx+c=0$, and solving the equation for a positive root $$x = \frac{-b + \sqrt{b^2 - 4ac}}{2a}.$$

Therefore, solving the foregoing quadratic equation and taking a positive solution for M results in the following:

$$M + M - 2L = 0 \Rightarrow M = \frac{-1 + \sqrt{1 + 8L}}{2}.$$

For any inputted string of substantial length, e.g., such as the preferable 1,000 bits described above, the constant terms become insignificant and a good estimate for the number of phases (M) results from ignoring the additive constant terms, thereby resulting in the following: $M=\sqrt{2L}$. Since the minimum number of phrases (N) in the inputted string is already known (step 506) and the string length of the given string is known (step 506), the number of phrases in the LZ78 partition can be normalized based on the estimate of the number of phrases $M=\sqrt{2L}$, resulting in the following equation for the normalized complexity estimate for the Kolmogorov Complexity:

$$C \equiv \frac{N}{\sqrt{2L}},$$

where C is the normalized complexity estimate of the Kolmogorov Complexity, N is the number of phrases in an LZ78 partition for the inputted string and L is the length of the inputted string.

Figure 6:
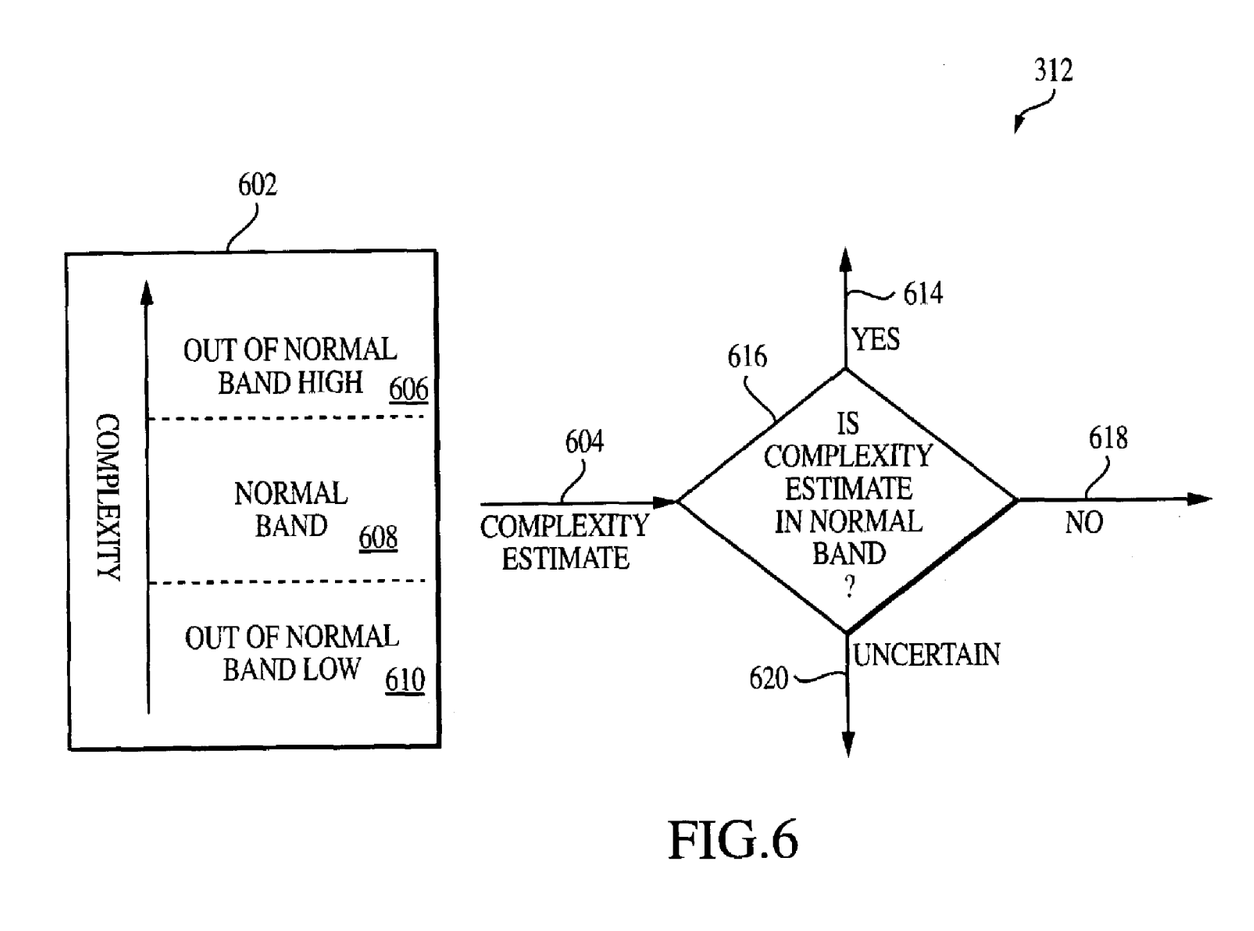
FIG. 6 is a detailed representation of the complexity evaluator of FIG. 3 according to the present invention.

FIG. 6 is an exemplary detailed representation of the complexity evaluator 312 of FIG. 3 according to the present invention. More specifically, the complexity evaluator 312 receives from the complexity estimator 310 a complexity estimate 604 of the Kolmogorov Complexity in the string acquired by data acquisition 308. The complexity evaluator 312 via comparison 616 evaluates whether the complexity estimate for the acquired string is within a predetermined normal complexity band 608. At illustration 602, there is depicted the predetermined normal complexity band 608 for complexity estimates, and out of normal band low 610 and out of normal band high 606 for complexity estimates. If the complexity estimate 604 is not within the predetermined normal complexity band 608, i.e., the complexity estimate is either within an out of normal complexity band high 606 or within an out of normal complexity band low 610, the complexity evaluator 312 transmits a negative evaluation of the complexity estimate 618 to the data port 306 in the complexity analyzer 204. If the complexity estimate 604 is within the predetermined normal complexity band 608, the complexity evaluator 312 transmits a positive evaluation of the complexity estimate 614 to the data port 306 in the complexity analyzer 204. Alternatively, if the complexity evaluator 312 via comparison 616 evaluates that the complexity estimate 604 is uncertain, i.e., such as being falling approximately on the border between the predetermined normal complexity band 608 and the one of the out of normal complexity band high 606 or the out of normal complexity band low 610, the complexity evaluator 312 transmits an uncertain evaluation of the complexity estimate 620 to the data port 306 in the complexity analyzer 204.

Figure 7A:
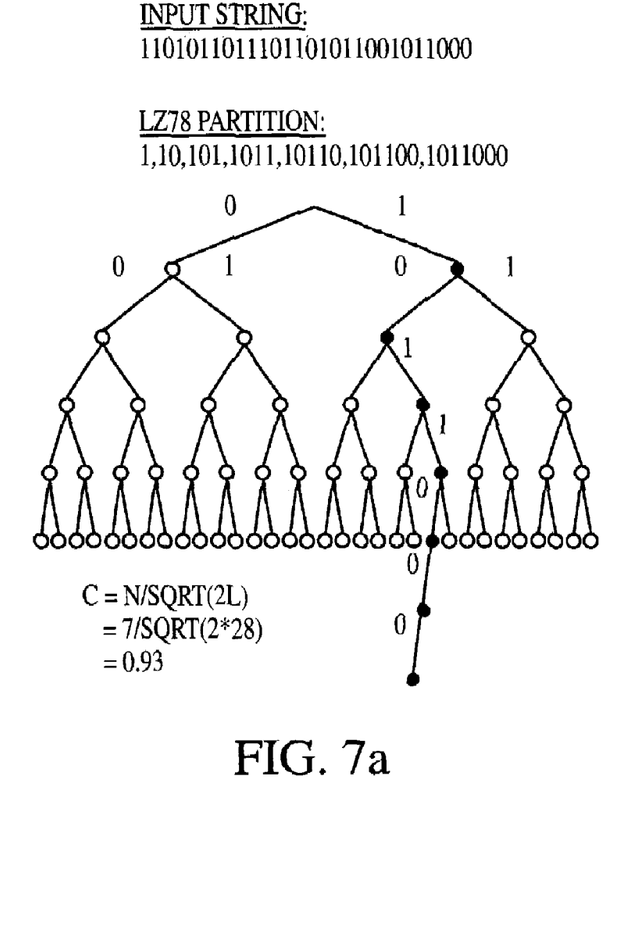
FIGS. 7a-7b depict exemplary input strings, LZ78 partitions for the input strings and the associated complexity estimates of the Kolmogorov Complexity for the LZ78 partitions, according to the present invention.
Figure 7B:
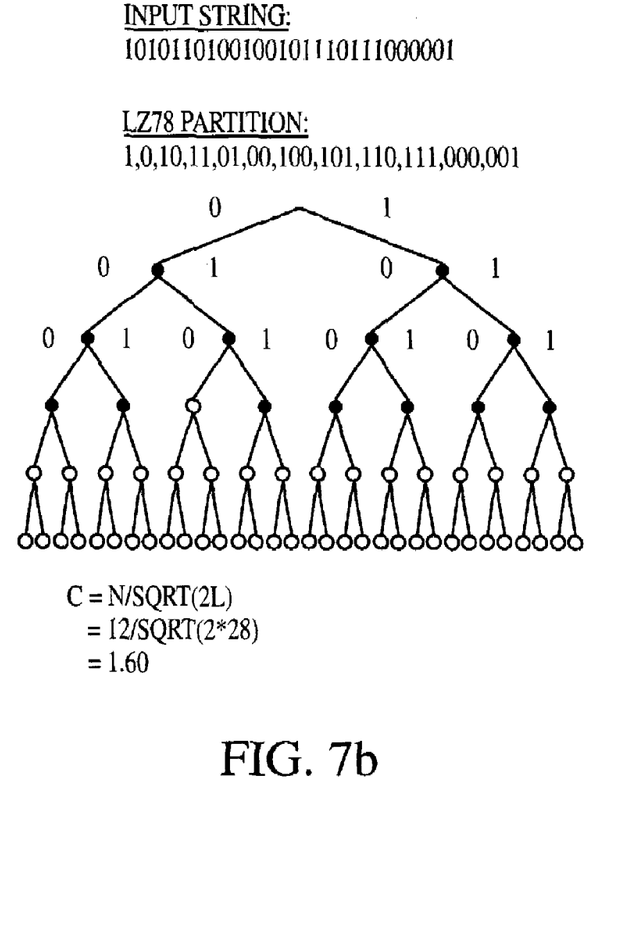

FIGS. 7a-7b are exemplary binary tree representations of two LZ78 partitions for two inputted strings and the associated complexity estimates of the Kolmogorov Complexity according to the present invention. In both FIGS. 7a and 7b, the LZ78 partitions are obtained from the finite strings of 28 bits in length (L) each for illustrative purposes. In the binary trees of FIGS. 7a and 7b, the nodes that are colored black are considered to be in the LZ78 partition. Whereas in FIG. 7a the inputted string is partitioned into an LZ78 partition with 7 unique phrases, in FIG. 7b the inputted string is partitioned into 12 unique phases. The binary trees in FIGS. 7a and 7b, clearly demonstrate that the LZ78 partition in FIG. 7a would be highly compressible by the LZ78 compression algorithm illustrated in FIG. 1, and that the LZ78 compression algorithm will not compress the LZ78 partition in FIG. 7b. It is noted that the maximum compression by the LZ78 compression algorithm of FIG. 1 occurs if all phrases are children of the same branch in a binary tree (i.e., the least number of phrases). The fewer the number of phrases in the LZ78 partition, the better the compression by the LZ78 compression algorithm. Amongst FIGS. 7a and 7b, the minimum number of phrases in the associated LZ78 partition occurs in FIG. 7a, i.e., 7 phrases. In FIG. 7a, the phrases (N) occur such that each successive phrase (sub-string) is one bit longer than the previous phrase, where each phrase is unique and of monochromatically increasing length, and the sum of the lengths for all phrases is equal to the length (L) of the inputted string. In contrast, as depicted in FIG. 7b, each level of the binary tree is filled in, i.e., each node of every level is colored black, thereby graphically depicting many more phrases than in FIG. 7a, i.e., 12 phrases.

Further with reference to FIGS. 7a and 7b, using the formula $$C \equiv \frac{N}{\sqrt{2L}}$$

derived with reference to FIG. 5 in accordance with the present invention, the normalized complexity estimate for the Kolmogorov Complexity of the inputted string in FIG. 7a is C=0.93 and the complexity estimate for the Kolmogorov Complexity of the input string in FIG. 7b is C=1.60. It is noted that the computed complexity estimate according to the present invention is similar in nature to the inverse compression ratio of the LZ78 compression algorithm determined at step 110 in FIG. 1. However, the foregoing compression estimates according to the present invention are achieved without the inefficient encoding, compressing and computing of the inverse compression ratios that are associated with the LZ78 compression algorithm estimation for the Kolmogorov Complexity. Consequently, the complexity estimate (C) for inputted string in FIG. 7a is nearly twice as high as that for the inputted string in FIG. 7b, according to the present invention. The complexity estimate of the Kolmogorov Complexity according to the present invention has the very desirable complexity estimation properties of LZ78 compression algorithm without the need for completing the encoding, compressing and computation of inverse compression ratios.

While the invention has been particularly shown and described with regard to a preferred embodiment thereof, it will be understood by those skilled in the art that the foregoing and other changes in form and details may be made therein without departing from the spirit and scope of the invention.

The invention claimed is:

1. A data transmission system for determining whether to allow transmission of data, the data transmission system comprising:
   a source for transmitting data destined for a destination over a network;
   a data acquisition means for acquiring a string of a predetermined length in bits (L) from the data;
   a complexity estimator for:
   (i) partitioning the acquired string into a partition of phrases, each of the phrases in the partition being unique and having one or more bits;

(ii) determining a number of phrases (N) in the partition; and (iii) estimating a normalized complexity (C) for the Kolmogorov Complexity in the acquired string via $$C \equiv \frac{N}{\sqrt{2L}};$$

a complexity evaluator for evaluating whether to allow transmission of the data based on a comparison of whether the normalized complexity estimate (C) is within a predetermined normal complexity estimate band; and the destination for receiving the data transmitted from the source based on the evaluation.

2. A data transmission system for determining whether to allow transmission of data from a source destined for a destination over a network according to claim 1, wherein the a data acquisition means acquires the string at a predetermined increment of time.

3. A data transmission system for determining whether to allow transmission of data from a source destined for a destination over a network according to claim 1, wherein the source and the destination are nodes disposed along the network.

4. A data transmission system for determining whether to allow transmission of data from a source destined for a destination over a network according to claim 1, wherein the network is one or more of a local area network, an intranet and an internet.

5. A data transmission system for determining whether to allow transmission of data from a source destined for a destination over a network according to claim 1, wherein the source is one of a web server and client server and the destination is a client of the source.

6. A data transmission system for determining whether to allow transmission of data from a source destined for a destination over a network according to claim 1, wherein the source is one of data storage and resource storage and the destination is one of client application and server application receiving data from the source.

7. A data transmission system for determining whether to allow transmission of data from a source destined for a destination over a network according to claim 1, wherein transmission of the data between the source and the destination utilizes one or more communication protocols selected from a group consisting of:

Transfer Control Protocol/Internet Protocol (TCP/IP);
Advanced Data Communications Control Protocol (ADCCP);
Synchronous Data Link Control (SDLC);
High-Level Data Link Control (HDLC); and
Advanced Program-to-Program Communications (APPC).

8. A data transmission system for determining whether to allow transmission of data from a source destined for a destination over a network according to claim 1, wherein the data transmission system further comprises a data port for:

receiving the data from the source destined for the destination; and determining whether or not to transmit the data received from the source to the destination based on the evaluation of the complexity evaluator.

9. A data transmission system for determining whether to allow transmission of data from a source destined for a destination over a network according to claim 8, wherein the data port:

transmits the data from the source to the destination if the complexity evaluator evaluates that the normalized complexity estimate (C) is within the predetermined normal complexity estimate band;

secures the data port by stopping all data transmission from the source to the destination if the complexity estimate (C) is outside the predetermined normal complexity estimate band; and transmits the data from the source to the destination and monitors future data transmission from the source to the destination if the complexity estimate (C) is on a border of the predetermined normal complexity band.

10. A complexity analyzer for determining whether to allow transmission of data from a source destined for a destination over a network, the complexity analyzer comprising:

a data acquisition means for acquiring a string of a predetermined length in bits (L) from the data;

a complexity estimator for:

(i) partitioning the acquired string into a partition of phrases, each of the phrases in the partition being unique and having one or more bits;

(ii) determining a number of phrases (N) in the partition; and (iii) estimating a normalized complexity (C) for the Kolmogorov Complexity in the acquired string via $$C \equiv \frac{N}{\sqrt{2L}};$$

and a complexity evaluator for evaluating whether to allow transmission of the data based on a comparison of whether the normalized complexity estimate (C) is within a predetermined normal complexity estimate band.

11. A complexity analyzer for determining whether to allow transmission of data from a source destined for a destination over a network according to claim 10, wherein the a data acquisition means acquires the string at a predetermined increment of time.

12. A complexity analyzer for determining whether to allow transmission of data from a source destined for a destination over a network according to claim 10, wherein the complexity analyzer is included in one selected from a group consisting of: a firewall; a bridge; a gateway; a demilitarized zone; a network node.

13. A complexity analyzer for determining whether to allow transmission of data from a source destined for a destination over a network according to claim 10, wherein the source and the destination are nodes disposed along the network.

14. A complexity analyzer for determining whether to allow transmission of data from a source destined for a destination over a network according to claim 10, wherein the network is one or more of a local area network, an intranet and an internet.

15. A complexity analyzer for determining whether to allow transmission of data from a source destined for a destination over a network according to claim 10, wherein the source is one of a web server and client server and the destination is a client of the source.

16. A complexity analyzer for determining whether to allow transmission of data from a source destined for a destination over a network according to claim 10, wherein the source is one of data storage and resource storage and the destination is one of client application and server application receiving data from the source.

17. A complexity analyzer for determining whether to allow transmission of data from a source destined for a destination over a network according to claim 10, wherein transmission of the data between the source and the destination utilizes one or more communication protocols selected from a group consisting of:
  Transfer Control Protocol/Internet Protocol (TCP/IP);
  Advanced Data Communications Control Protocol (AD-CCP);
  Synchronous Data Link Control (SDLC);
  High-Level Data Link Control (HDLC); and
  Advanced Program-to-Program Communications (APPC).

18. A complexity analyzer for determining whether to allow transmission of data from a source destined for a destination over a network according to claim 10, wherein the data transmission system further comprises a data port for:
  receiving the data from the source destined for the destination; and
  determining whether or not to transmit the data received from the source to the destination based on the evaluation of the complexity evaluator.

19. A complexity analyzer for determining whether to allow transmission of data from a source destined for a destination over a network according to claim 18, wherein the data port:
  transmits the data from the source to the destination if the complexity evaluator evaluates that the normalized complexity estimate (C) is within the predetermined normal complexity estimate band;
  secures the data port by stopping all data communication from the source to the destination if the complexity estimate (C) is outside the predetermined normal complexity estimate band; and
  transmits the data from the source to the destination and monitors future data transmission from the source to the destination if the complexity estimate (C) is on a border of the predetermined normal complexity band.

20. A complexity estimator for determining an estimate of complexity for Kolmogorov Complexity in a string of a predetermined length in bits (L) acquired from data transmitted from a source destined for a destination over a network, the complexity estimator comprising:
  a partition means for partitioning the acquired string into a partition of phrases, each of the phrases in the partition being unique and having one or more bits;
  a determination means for determining a number of phrases (N) in the partition; and
  an estimation means for estimating a normalized complexity (C) for the Kolmogorov Complexity in the acquired string via $$C \equiv \frac{N}{\sqrt{2L}},$$

wherein transmission of the data is enabled to the destination if the normalized complexity estimate (C) is within a predetermined normal complexity estimate band.

21. A complexity estimator for determining an estimate of complexity for Kolmogorov Complexity according to claim 20, wherein the partition means partitions the acquired string according to Lempel/Ziv 78 partition algorithm.

22. A method for determining whether to allow transmission of data from a source destined for a destination over a network, the method comprising:
  (a) acquiring a string of a predetermined length in bits (L) from the data;
  (b) partitioning the acquired string into a partition of phrases, each of the phrases in the partition being unique and having one or more bits;
  (c) determining a number of phrases (N) in the partition;
  (d) estimating a normalized complexity (C) for the Kolmogorov Complexity in the acquired string via $$C \equiv \frac{N}{\sqrt{2L}};$$

and
  (e) evaluating whether to allow transmission of the data based on a comparison of whether the normalized complexity estimate (C) is within a predetermined normal complexity estimate band.

23. A method for determining whether to allow transmission of data from a source destined for a destination over a network according to claim 22, the method further comprising:
  transmitting the data from the source to the destination if the normalized complexity estimate (C) is within the predetermined normal complexity estimate band;
  stopping all data transmission from the source to the destination if the complexity estimate (C) is outside the predetermined normal complexity estimate band; and
  transmitting the data from the source to the destination and monitoring future data transmission from the source to the destination if the complexity estimate (C) is on a border of the predetermined normal complexity band.

24. A method for determining an estimate of complexity for Kolmogorov Complexity in a string of a predetermined length in bits (L) acquired from data transmitted from a source destined for a destination over a network, the method comprising:
  (a) partitioning the acquired string into a partition of phrases, each of the phrases in the partition being unique and having one or more bits;
  (b) determining a number of phrases (N) in the partition; and
  (c) estimating a normalized complexity (C) for the Kolmogorov Complexity in the acquired string via $$C \equiv \frac{N}{\sqrt{2L}},$$

wherein transmission of the data is enabled to the destination if the normalized complexity estimate (C) is within a predetermined normal complexity estimate band.

25. A program storage device, tangibly embodying a program of instructions executable by a machine to perform a method for determining whether to allow transmission of data from a source destined for a destination over a network, the method comprising:

(a) acquiring a string of a predetermined length in bits (L) from the data;

(b) partitioning the acquired string into a partition of phrases, each of the phrases in the partition being unique and having one or more bits;

(c) determining a number of phrases (N) in the partition;

(d) estimating a normalized complexity (C) for the Kolmogorov Complexity in the acquired string via $$C \equiv \frac{N}{\sqrt{2L}};$$

and (e) evaluating whether to allow transmission of the data based on a comparison of whether the normalized complexity estimate (C) is within a predetermined normal complexity estimate band.

26. A program storage device, tangibly embodying a program of instructions executable by a machine to perform a method for determining an estimate of complexity for Kolmogorov Complexity in a string of a predetermined length in bits (L) acquired from data transmitted from a source destined for a destination over a network, the method comprising:

(a) partitioning the acquired string into a partition of phrases, each of the phrases in the partition being unique and having one or more bits;

(b) determining a number of phrases (N) in the partition; and (c) estimating a normalized complexity (C) for the Kolmogorov Complexity in the acquired string via $$C \equiv \frac{N}{\sqrt{2L}},$$

wherein transmission of the data is enabled to the destination if the normalized complexity estimate (C) is within a predetermined normal complexity estimate band.

* * * * *